United States Patent [19]
Ahmad et al.

[11] Patent Number: 5,841,130
[45] Date of Patent: Nov. 24, 1998

[54] SYSTEM FOR MONITORING STRAIN IN CONCRETE STRUCTURES

[75] Inventors: Falih H. Ahmad, Clinton, Miss.; James A. Evans, Tallulah, La.; Barry D. Fehl, Vicksburg, Miss.; Anthony A. Bombich, Clinton, Miss.; Lonnie L. Smith, Vicksburg, Miss.

[73] Assignee: The United States of America as represented by the Secretary of the Army, Washington, D.C.

[21] Appl. No.: 795,526

[22] Filed: Feb. 14, 1997

[51] Int. Cl.⁶ .................................................. H01J 5/16
[52] U.S. Cl. ........................ 250/227.14; 385/13; 340/555
[58] Field of Search ....................... 250/227.14, 227.15, 250/227.16; 385/13, 12; 73/768, 789, 803, 804; 340/555–557, 541

[56] References Cited

U.S. PATENT DOCUMENTS

| | | | |
|---|---|---|---|
| 5,212,379 | 5/1993 | Nafarrate et al. | 250/227.14 |
| 5,343,035 | 8/1994 | Equalon et al. | 250/227.14 |
| 5,374,821 | 12/1994 | Muhs et al. | 250/227.15 |
| 5,381,492 | 1/1995 | Dooley et al. | 385/12 |
| 5,381,493 | 1/1995 | Egalon et al. | 385/13 |
| 5,446,278 | 8/1995 | Weiss | 250/227.15 |
| 5,513,913 | 5/1996 | Ball et al. | 374/120 |

*Primary Examiner*—Que Le
*Attorney, Agent, or Firm*—Luther A. Marsh

[57] ABSTRACT

A system for monitoring strain in concrete structures comprises a frame for embedding in the structure with first and second ends of the frame proximate an edge of the structure, a fiber-optic cable mounted on the frame and extending substantially from the frame first end to the frame second end, a light source in communication with a first end of the cable, a light detector in communication with a second end of the cable, and an information processor in communication with the light detector. The cable is adapted to propagate light from the source to the detector, and the processor is adapted to identify strain in the structure from data generated by the detector.

4 Claims, 1 Drawing Sheet

SYSTEM FOR MONITORING STRAIN IN CONCRETE STRUCTURES

BACKGROUND OF THE INVENTION

1. Field of the Invention

This invention relates to optical monitoring systems and is directed more particularly to a monitoring system for detection of strain in concrete structures, dams, and the like.

2. Description of the Prior Art

Strain build-up in concrete dams, and similar structures, causes failures of such structures, usually with little or no warning. Early detection and monitoring of strained regions of concrete structures provides engineers with an opportunity to treat the strained sections and avert disaster. However, unless a strained concrete structure exhibits some degree of collapse, obvious to the eye, on-site inspections are not likely to provide forewarning. Visual inspection has been found inadequate to diagnose, and provide the opportunity to prevent, catastrophic failure. In addition, extremely costly methods that utilize standard pressure sensors or accelerometers provide limited dynamic range and reliability.

Accordingly, there is a need for a system for continuously or intermittently obtaining data from the concrete structure and providing information as to the structural condition of the concrete.

SUMMARY OF THE INVENTION

An object of the invention is, therefore, to provide a system for determining and monitoring the structural integrity of a concrete work, such as a dam.

With the above and other objectives in view, as will hereinafter appear, a feature of the present invention is the provision of a system for monitoring strain in concrete structures, the system comprising a frame for embedding in the structure with first and second ends of the frame proximate an edge of the structure, a fiber-optic cable mounted on the frame and extending substantially from the frame first end to the frame second end, a light source in communication with a first end of the cable, a light detector in communication with a second end of the cable, and an information processor in communication with the light detector. The cable is adapted to propagate light from the source to the detector, and the processor is adapted to identify strain in the structure from data generated by the detector.

The above and other features of the invention, including various novel details of construction and combinations of parts, will now be more particularly described with reference to the accompanying drawing and pointed out in the claims. It will be understood that the particular system embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing, consisting of a single FIGURE, in which is shown an illustrative embodiment of the invention, from which its novel features and advantages will be apparent.

The FIGURE is a diagrammatic view of one form of system for monitoring strain in a concrete structure, illustrative of an embodiment of the invention.

DESCRIPTION OF THE PREFERRED EMBODIMENTS

Figure 1:
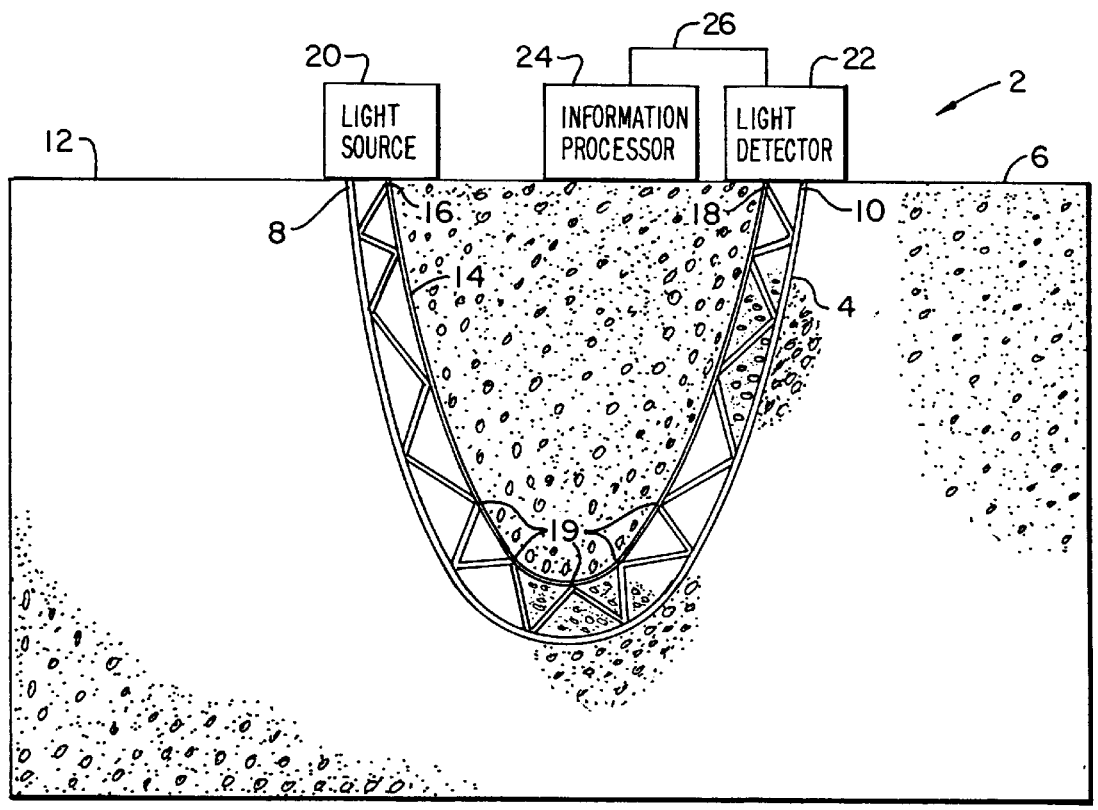

Referring to the FIGURE, it will be seen that an illustrative system 2 includes a skeletal frame 4 embedded in a concrete structure 6 to be monitored. First and second ends 8, 10 of the frame 4 are disposed proximate an edge 12 of the frame 4 so as to be accessible. Mounted on the frame 4 is a fiber-optic cable 14 extending substantially from the frame first end 8 to the frame second end 10 and disposed at its ends 16, 18 at the edge 12 of the concrete structure 6. As shown in the FIGURE, the frame is configured to provide a series of ridges 19 on which the cable 14 is fixed to the frame. Thus, a major portion of the cable 14 is spaced from the frame 4, and is surrounded by the concrete of the structure 6. The frame 4 is of a rigid material, such as metal, and the skeletal configuration thereof permits the concrete to securely anchor the frame 4 therein. The cable 14 is fixed to the frame 4 in a tensioned, or taut, condition to place a slight strain on the cable.

A light source 20 is disposed externally of the concrete structure 6 and is connected to the first end 16 of the fiber-optic cable 14. A light detector 22 is disposed externally of the concrete structure 6 and is connected to the second end 18 of the fiber-optic cable 14. The light source 20 is operative to transmit light signals to the fiber-optic cable 14, which is operative to transmit light therethrough. The light detector 22 is operative to receive the light signals sent by the light source 20 and propagated through the fiber-optic cable 14, and to compile data relative to selected parameters of the light signals.

An information processor 24 is in communication with the light detector 22 by way of a communication cable 26. The information processor 24 is adapted to receive data from the light detectors 22 and make comparisons of the received data and pre-programmed data to detect any irregularities.

In operation, light from the source 20 is propagated through the fiber optic cable 14. The light is received and analyzed by the light detector 22. The information processor 24 extracts spectral and temporal information from the light detector 22. Information from both domains is used to present strain data of the concrete in which the fiber-optic cable 14 is embedded. The light source 20 and the light detector 22 are selected to operate at a frequency suitable to the fiber optic cable 14. The pre-formed frame 4 serves to maintain the pre-strain on the fiber-optic cable 14, to position the cable 14 in the monitored concrete structure 6 and maintain the geometric shape of the fiber-optic cable 14. Any change in the strain level in the concrete structure 6 along the path of the fiber-optic cable 14 introduces a loading on the cable 14. This loading renders changes in the geometric properties of the cable 14. Also, such loading causes a change in the level of the strain of the material from which the fiber optic cable is made. Because of these two types of changes, the characteristics of the light propagating through the cable 14 changes. Changes in the characteristics of the propagating light are detected by the light detector 22, monitored by the information processor 24, and used by the information processor 24 to produce a location and magnitude of strain present in the concrete structure 6.

There is thus provided a system for determining and monitoring the structural integrity of a concrete structure.

It is to be understood that the present invention is by no means limited to the particular construction herein disclosed and/or shown in the drawings, but also comprises any modifications or equivalents within the scope of the claims.

What is claimed is:

1. A system for monitoring strain in concrete structures, said system comprising:
   a frame for embedding in the structure with first and second ends of said frame proximate an edge of the structure;
   a fiber-optic cable mounted on said frame and extending substantially from said frame first end to said frame second end;
   a light source in communication with a first end of said cable;
   a light detector in communication with a second end of said cable; and
   an information processor in communication with said light detector;
   said cable being adapted to propagate light from said light source to said light detector, and said information processor being adapted to identify strain in the structure from data generated by said light detector.

2. The system in accordance with claim 1 wherein said frame comprises a rigid skeletal structure.

3. The system in accordance with claim 2 wherein said frame is configured to provide a series of ridges and said cable is fixed to said frame at said ridges, such that a major portion of said cable is spaced from said frame and surrounded by concrete of the structure.

4. The system in accordance with claim 3 wherein said light source, said light detector and said information processor are external of the concrete structure.

* * * * *